US008570938B2

(12) United States Patent  (10) Patent No.: US 8,570,938 B2
Eldering  (45) Date of Patent: Oct. 29, 2013

(54) METHOD AND SYSTEM FOR ADAPTIVE ANTENNA ARRAY PAIRING

(75) Inventor: Charles A. Eldering, Furlong, PA (US)

(73) Assignee: Empire Technology, Development, LLC, Wilmington, DE (US)

( * ) Notice: Subject to any disclaimer, the term of this patent is extended or adjusted under 35 U.S.C. 154(b) by 1217 days.

(21) Appl. No.: 12/201,403

(22) Filed: Aug. 29, 2008

(65) Prior Publication Data

US 2010/0054180 A1  Mar. 4, 2010

(51) Int. Cl.
*H04Q 7/00* (2006.01)

(52) U.S. Cl.
USPC ............................................. 370/328

(58) Field of Classification Search
USPC ............................................. 370/328
See application file for complete search history.

(56) References Cited

U.S. PATENT DOCUMENTS

| | | | |
|---|---|---|---|
| 5,917,446 A * | 6/1999 | Greenspan | 342/373 |
| 5,920,286 A | 7/1999 | Mohebbi | |
| 5,929,811 A | 7/1999 | Rilling | |
| 6,362,781 B1 | 3/2002 | Thomas et al. | |
| 6,463,303 B1 | 10/2002 | Zhao | |
| 6,611,231 B2 | 8/2003 | Crilly et al. | |
| 6,690,747 B2 | 2/2004 | Petrus et al. | |
| 6,735,445 B2 | 5/2004 | Sharony et al. | |
| 6,894,643 B2 | 5/2005 | Guo et al. | |
| 6,907,245 B2 | 6/2005 | Ohlsson et al. | |
| 6,970,682 B2 | 11/2005 | Crilly et al. | |
| 6,993,334 B2 | 1/2006 | Andrus et al. | |
| 7,010,055 B2 | 3/2006 | Harrison et al. | |
| 7,099,698 B2 | 8/2006 | Tarokh et al. | |
| 7,109,919 B2 | 9/2006 | Howell | |
| 7,224,685 B2 | 5/2007 | Proctor, Jr. | |
| 7,272,408 B2 | 9/2007 | Dalal et al. | |
| 7,388,540 B1 | 6/2008 | Zogg et al. | |
| 7,414,577 B2 | 8/2008 | Mohamadi | |
| 7,420,507 B2 | 9/2008 | Thomas et al. | |
| 7,426,198 B2 | 9/2008 | Mondal et al. | |
| 7,599,714 B2 | 10/2009 | Kuminskiy | |
| 7,876,268 B2 | 1/2011 | Jacobs | |

(Continued)

OTHER PUBLICATIONS

Smart Antennas to expand Wi-Fi Range, accessed at <http://www.computerworld.com/mobiletopics/mobile/technology/story/0,10801,88487,00.html> on Jan. 17, 2008.

(Continued)

*Primary Examiner* — Sulaiman Nooristany
(74) *Attorney, Agent, or Firm* — Carlineo, Spicer & Kee, LLC

(57) ABSTRACT

A method of pairing a first wireless access unit with a second wireless access unit in a mobile ad-hoc wireless pairing system includes determining that the second wireless access unit is available for pairing with the first wireless access unit and pairing the pairing the first wireless access unit with the second wireless access unit upon receiving an input from a user of the first wireless access unit. A location of the second wireless access unit is determined by adjusting a first wireless access unit weighting factor. The first wireless access unit weighting factor is adjusted until a threshold signal strength is received by the second wireless access unit. The first wireless access unit weighting factor is transmitted to the second wireless access unit, and feedback is received from the second wireless access unit. The feedback provides recommendations about the first wireless access unit weighting factor to the first wireless access unit.

11 Claims, 8 Drawing Sheets

(56) References Cited

U.S. PATENT DOCUMENTS

| | | | |
|---|---|---|---|
| 2001/0005685 A1* | 6/2001 | Nishimori et al. | 455/562 |
| 2003/0013450 A1 | 1/2003 | Wang et al. | |
| 2003/0064752 A1 | 4/2003 | Adachi et al. | |
| 2004/0178907 A1* | 9/2004 | Cordoba | 340/539.21 |
| 2006/0146754 A1 | 7/2006 | Bejerano | |
| 2007/0147361 A1 | 6/2007 | Lee | |
| 2007/0197164 A1* | 8/2007 | Sheynman et al. | 455/41.2 |
| 2008/0014941 A1 | 1/2008 | Catovic et al. | |
| 2008/0238688 A1 | 10/2008 | Rofougaran et al. | |
| 2009/0225879 A1 | 9/2009 | Kloos et al. | |
| 2010/0060523 A1 | 3/2010 | Yamazaki et al. | |
| 2010/0194629 A1 | 8/2010 | Craig et al. | |

OTHER PUBLICATIONS

Bandspeed, Inc.—Product FAQs, accessed at <http://www.bandspeed.com/support/faq.php> on Oct. 2, 2008.
Bandspeed, Inc.—AirMaestro 3100AG Virtual Controller Starter Kit, accessed at <http://www.bandspeed.com/products/3100ag_kit.php> on Oct. 2, 2008.
Getting the Most out of MIMO, accessed at <http://www.atheros.com/pt/whitepapers/MIMO_WLAN_Perf_whitepaper.pdf> on Jan. 14, 2008.
UWB Signal Sources, Antennas & Propagation, accessed at <http://www.picosecond.com/objects/AN-14a.pdf> on Jan. 14, 2008.
A Brief History of UWB Antennas, accessed at <http://www.coe.montana.edu//ee/rwolff/EE5481EE548-S06/UWB/Intro_UWBAntennas.pdf> on Jan. 14, 2008.

* cited by examiner

METHOD AND SYSTEM FOR ADAPTIVE ANTENNA ARRAY PAIRING

CROSS REFERENCE TO RELATED APPLICATIONS

This application is related to U.S. patent application Ser. No. 12/201,381, now U.S. Pat. No. 8,126,486, filed Aug. 29, 2008, entitled Adaptive Antenna Weighting System for Wireless Local Area and Personal Area Networks, and U.S. patent application Ser. No. 12/201,415, filed Aug. 29, 2008, entitled Weighting Factor Adjustment in Adaptive Antenna Arrays.

BRIEF DESCRIPTION OF THE DRAWINGS

The following detailed description will be better understood when read in conjunction with the appended drawings, in which there is shown one or more of the multiple embodiments disclosed herein. It should be understood, however, that the various embodiments are not limited to the precise arrangements and instrumentalities shown in the drawings.

In the Drawings.

DETAILED DESCRIPTION

Figure 1:
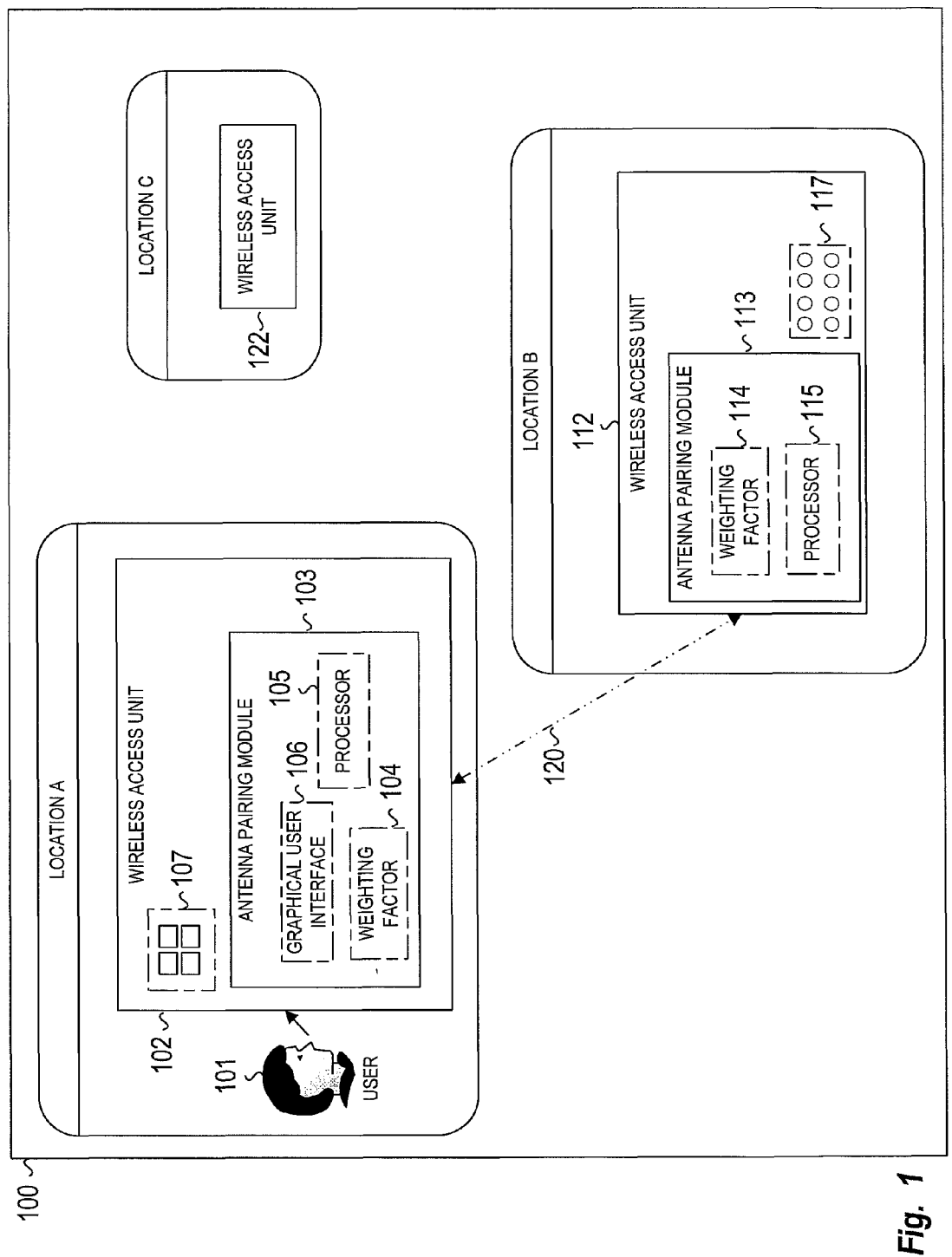
FIG. 1 is a system diagram of a mobile ad-hoc wireless pairing system according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments disclosed herein, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

This disclosure is drawn, inter alia, to methods, apparatus, computer programs and systems related to antenna pairing. Referring to FIG. 1, one embodiment of a mobile ad-hoc wireless pairing system 100 is shown. The mobile ad-hoc wireless pairing system 100 includes at least two wireless access units 102, 112, each having an adaptive antenna array 107, 117, respectively, having a plurality of individual antenna elements. Throughout the present disclosure there are references to the wireless access unit 101, 112 transmitting a signal or radiation pattern. It will be understood by those skilled in the art that the antenna array within each wireless access unit facilitates this transmission.

The wireless access units 102, 112 increase and/or maximize the directivity of their signals in a desired direction and simultaneously reduce the signal in non-desired directions, such that the quality of a communications link between the wireless access units 102, 112 is significantly improved. Although shown in FIG. 1 at Locations A and B, respectively, the wireless access units 102, 112 may be located anywhere within the mobile ad-hoc wireless pairing system 100 where they are capable of wirelessly transmitting and receiving data with each other. The wireless access unit 102 includes an antenna pairing module 103 having a processor 105, a weighting factor 104, and a graphical user interface (GUI) 106, which allows the user 101 to initiate and establish communications, known as pairing, with wireless access unit 112 via communications channel 120, and otherwise interact with the wireless access unit 102.

Those skilled in the art will recognize that pairing is a trusted wireless relationship between two units. Pairing between wireless access units 102, 112 establishes communications channel 120, which does not exist until a user 101 selects to pair wireless access unit 102 with wireless access unit 112. Once pairing is established, data may be transferred between wireless access units 102, 112 via the communications channel 120. Pairing may be accomplished through the use of any wireless communications protocol generally known in the art, including, but not limited to, Bluetooth communications, IEEE 802.11 standards, or IEEE 802.16 standards.

The wireless access unit 102 can wirelessly transmit and receive data to/from the second wireless access unit 112. The wireless access units 102, 112 in the mobile ad-hoc wireless pairing system 100 may be any device that is capable of receiving and transmitting data using an electromagnetic signal. For example, the wireless access units 102, 112 may be a desktop computer, a laptop computer, a personal digital assistant (PDA), a mobile phone, a television, a video game system, an electronic system within a vehicle, a global positioning system (GPS) navigation device, a digital camera, or a portable music player.

In the embodiment of FIG. 1, the data exchanged between the wireless access units 102, 112 is encrypted to prevent unauthorized access by non-paired units. A unit that pairs with wireless access unit 102 should be authenticated before pairing occurs. Pairing between the two wireless access units 102, 112 causes the processor 105, 115 of each wireless access unit to adjust its weighting factor 104, 114, which controls the radiation pattern of the respective adaptive antenna array 107, 117. If the user 101 desires to pair with only one other wireless access unit, then the wireless access unit 102 adjusts its weighting factor 104 to maximize power radiated in the direction of the paired unit and minimize power in other directions. The wireless access unit 102 is not limited to pairing with one other wireless access unit, but may be paired with a plurality of wireless access units. If the user 101 desires to pair with a plurality of wireless access units, then the wireless access unit 102 adjusts its weighting factor 104 to maximize power radiated in the direction of the paired unit, but in a manner that allows the wireless access unit 102 to transmit a cognizable signal in other directions. A wireless access unit is available for pairing if the wireless access unit 102 receives a cognizable signal from the other wireless access unit(s). In one embodiment, pairing between two units may be re-established without the use of the GUI 106 by automatically re-pairing two previously paired units that are in close proximity to each other. This will provide the user with the convenience of not using the GUI to re-pair frequently used units.

In the embodiment of FIG. 1, the user 101 may pair wireless access unit 102 with either wireless access unit 112 or wireless access unit 122. For purposes of the present description and examples, it will be assumed that the user 101 has selected to pair with wireless access unit 112 via the GUI 106. Pairing between the two units 102, 112 is accomplished via the antenna pairing modules 103, 113. When attempting to pair two wireless access units, those skilled in the art will appreciate that a first wireless access unit operates in the same frequency band as a second wireless access unit, although the wireless access unit is not limited to any one particular frequency band. In one embodiment, the wireless access unit operates in the ultra high frequency range (UHF). The UHF range has a frequency range between 300 MHz and 3 GHz. In another embodiment, the wireless access unit operates in the super high frequency (SHF) range. The SHF range has a frequency range between 3 GHz and 30 GHz.

As discussed, each wireless access unit 102, 112 in FIG. 1 includes an adaptive antenna array 107, 117 having a plurality of individual antenna elements. The adaptive antenna arrays 107, 117 in the wireless access units 102, 112 may be configured in any number of ways using different types of antennas or antenna elements generally known in the art (e.g., monopole, dipole, patch, or horn element, etc). The antenna elements may be arranged in a variety of fixed m×n arrays, provided that the respective adaptive antenna array produces a desired radiation pattern.

Each antenna element in the arrays 107, 117 has a weighting factor 104, 114 associated therewith. In the present disclosure, embodiments are described with the weighting factors arranged in a matrix configuration; however, in view of the present disclosure, those skilled in the art will appreciate that other, non-matrix configurations are possible as well. The weighting factors are based upon the amplitude and phase of each individual antenna element in an antenna array. Accordingly, the group of weighting factors or weighting factor matrix for any particular antenna array 107, 117 has the same configuration as the antenna elements in the respective antenna array 107, 117. For example, if the antenna elements are arranged in a 2×3 configuration, the weighting factor matrix for the array will be in the form of a 2×3 matrix. In the embodiment of FIG. 1, wireless access unit 102 has a 2×2 array of patch antenna elements 107 and wireless access unit 112 has a 2×4 array of monopole antenna elements 117. Accordingly, the weighting factor 104 is a 2×2 matrix and the weighting factor 114 is a 2×4 matrix.

In view of the present disclosure, those skilled in the art will appreciate that the weighting factor of each antenna element determines the radiation pattern of the respective antenna array 107, 117 and thus the wireless access unit 102, 112. The radiation pattern is a plot of the radiation received at a given distance away from the signal source. By adjusting the amplitude and phase components of each individual antenna element, it is possible to customize the weighting factor, the weighting factor matrix, and thus the radiation pattern of the antenna array and the wireless access unit 102, 112. The amplitude and phase components of each individual antenna element are based upon an electrical excitation signal controlled by the respective wireless access unit processor 105, 115. The wireless access unit weighting factor associated with each antenna element may be adjusted to reduce spurious radiation (e.g., radiation transmitted in unwanted directions) or transmit power in specific directions. This could prevent unwanted units from intercepting data that is being transmitted between paired units. It will also provide the two paired units with enough signal power to minimize the number of error bits transmitted between the wireless access units. This is accomplished by the wireless access unit processors 105, 115 exciting the different antenna elements with different voltages. The antenna elements may be excited using a variety of feeding techniques generally known in the art (e.g., microstrip line feed, probe feed, aperture-coupled feed, and proximity-coupled feed, etc.), providing a path for an electrical signal to excite the antenna elements. Additionally, the size and shape of each antenna element determines the operating frequency of the wireless access unit, although the wireless access unit is not limited to one particular frequency band.

Figure 2:
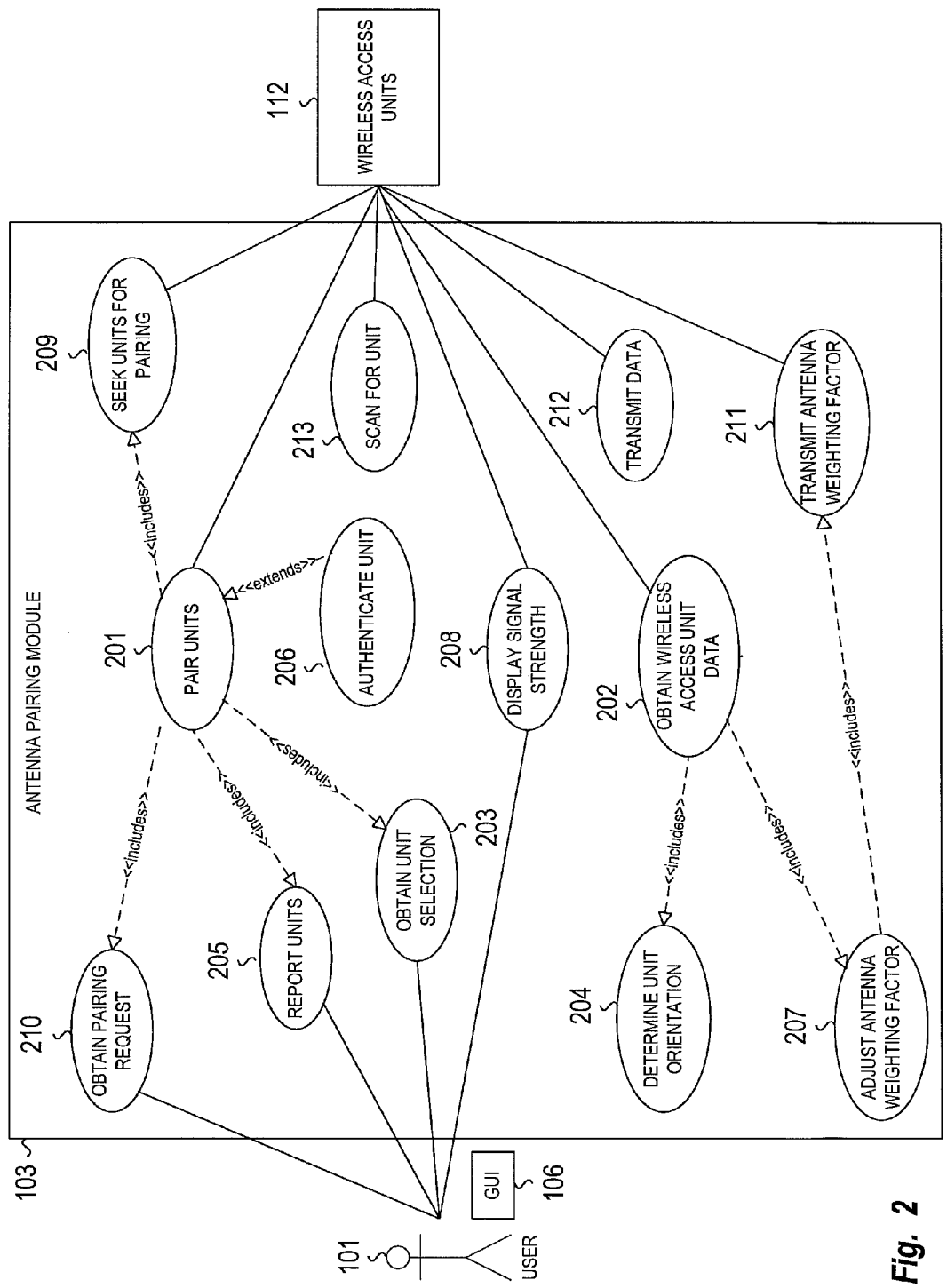
FIG. 2 is a use-case diagram of the antenna pairing module in accordance with the wireless pairing system of FIG. 1.

FIG. 2 is a use-case diagram for the antenna pairing module 103 and associated systems and actors in accordance with one embodiment. The Pair Units use case 201 includes the Obtain Pairing Request use case 210, Report Units use case 205, Obtain Unit Selection use case 203, and Seek Units for Pairing use case 209. The Pair Units use case 201 also allows for the automatic re-pairing of previously paired units via the Authenticate Unit use case 206. The Authenticate Unit use case 206 is used to authenticate the wireless access unit 112 by validating wireless access unit information, such as IP address and MAC address. The Obtain Pairing Request use case 210 allows the user 101 to request that wireless access unit 102 search for other wireless access units that are available for pairing. The Obtain Pairing Request use case 210 displays the searching options for wireless access units to the user 101 via the GUI 106. The Seek Units For Pairing use case 209 allows the wireless access unit 102 to determine the wireless access units that are available for pairing. The Report Units use case 205 informs the user 101 via the GUI 106 of the available wireless access units. The GUI 106 displays the available wireless access units to the user 101 in a format informing the user 101 that includes the wireless access unit name, the wireless access unit type, signal strength, and the relative location of the wireless access unit. The Obtain Unit Selection use case 203 allows the user 101 via the GUI 106 to select the desired wireless access unit (in this example, wireless access unit 112) from the available wireless access units. The Obtain Unit Selection use case 203 also allows the user 101 to determine if wireless access unit 102 is capable of pairing with only one other or multiple wireless access units.

The Obtain Wireless Access Unit Data use case 202 includes the Determine Unit Orientation use case 204 and the Adjust Antenna Weighting Factor use case 207. The Obtain Wireless access unit Data use case 202 receives different types of data from wireless access unit 112, including authentication data, wireless access unit signal strength, and weighting factors. The Determine Unit Orientation use case 204 determines that the wireless access unit weighting factor 104 should be adjusted to accommodate wireless access unit 112. The Determine Unit Orientation use case 204 may optionally determine if the wireless access unit 102 should be moved, rotated, or tilted to accommodate wireless access unit 112. The Adjust Antenna Weighting Factor use case 207 provides the user 101 with the option of modifying the current antenna element settings. Also, the Adjust Antenna Weighting Factor use case 207 modifies the weighting factor 104. Furthermore, the Adjust Antenna Weighting Factor use case 207, via the Transmit Antenna Weighting Factor use case 211, adjusts and optimizes the weighting factor 104 in response to receiving feedback data from the wireless access unit 112.

The Display Signal Strength use case 208 displayed to the user 101 via the GUI 106 the strength of the signal of paired authenticated wireless access units. The Display Signal Strength use case 208 also shows how the signal strength of wireless access units 102, 112 changes as the weighting factors 104, 114 change. The Transmit Data use case 212 transmits any data to the wireless access unit 112 that may be used to help optimize the weighting factors of wireless access units 102, 112. The Scan for Unit use case 213 is used by the wireless access unit 102 to find the direction of wireless access unit 112.

Figure 3:
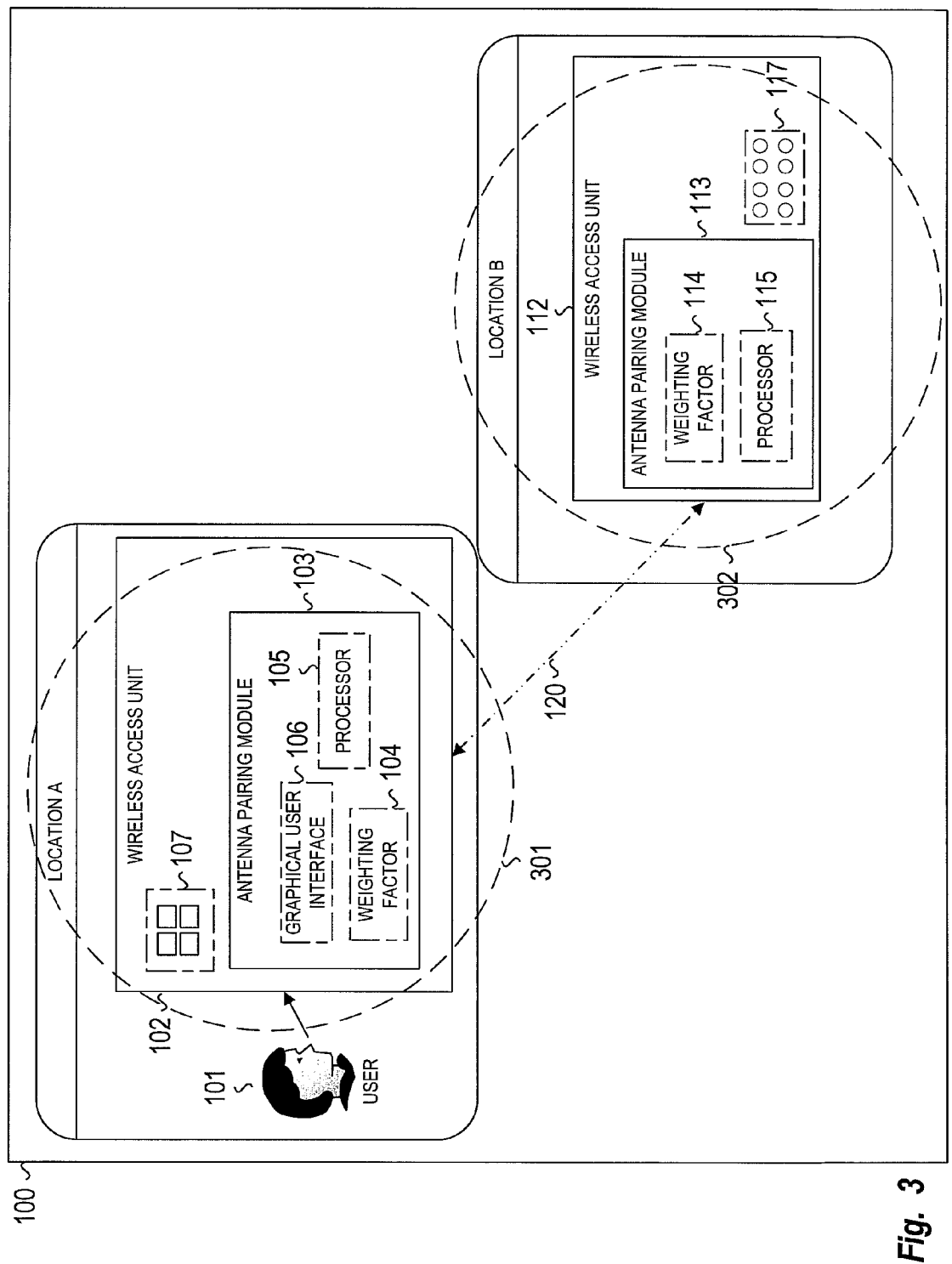
FIG. 3 is a system diagram of the wireless pairing system of FIG. 1 showing initial radiation patterns.

Referring to FIG. 3, exemplary initial radiation patterns 301, 302 of wireless access units 102, 112, respectively, are shown. The radiation patterns 301, 302 indicate the signal strength of a wireless access unit in a particular direction and generally show an omnidirectional radiation pattern, meaning that the wireless access units 102, 112 transmit and receive data approximately equally to/from all directions. This will allow wireless access unit 103 to seek out and pair with any nearby wireless access units. The zero axis reference point for radiation patterns 301, 302 of wireless access units 102, 112, respectively, is generally near the center of the respective antenna arrays 107, 117. The initial radiation patterns are determined by the types of antenna elements used and the strength of the electrical excitation signal for each antenna element. For example, if dipole antenna elements are used, the initial radiation pattern of the wireless access unit would resemble a Hertzian dipole. The weighting factors 104, 114 for wireless access units 102, 112 control the initial radiation patterns 301, 302. In view of the present disclosure, those skilled in the art will appreciate that the dashed lines representing the radiation patterns 301, 302 of the wireless access units 102, 112 in FIG. 3 is not the boundary or extent of the radiation, but demonstrates a comparative directionality and strength of the radiation pattern for a wireless access unit. Although FIG. 3 depicts radiation patterns 301, 302 having an omnidirectional radiation pattern, those skilled in the art will appreciate that wireless access units 102, 112 are not limited to having initial omnidirectional radiation patterns. Additionally, as discussed, wireless access unit 102 is not limited to pairing with only wireless access unit 112, but depending upon the user 101 selected configuration, may connect to multiple wireless access units (not shown in FIG. 3).

Figure 7:
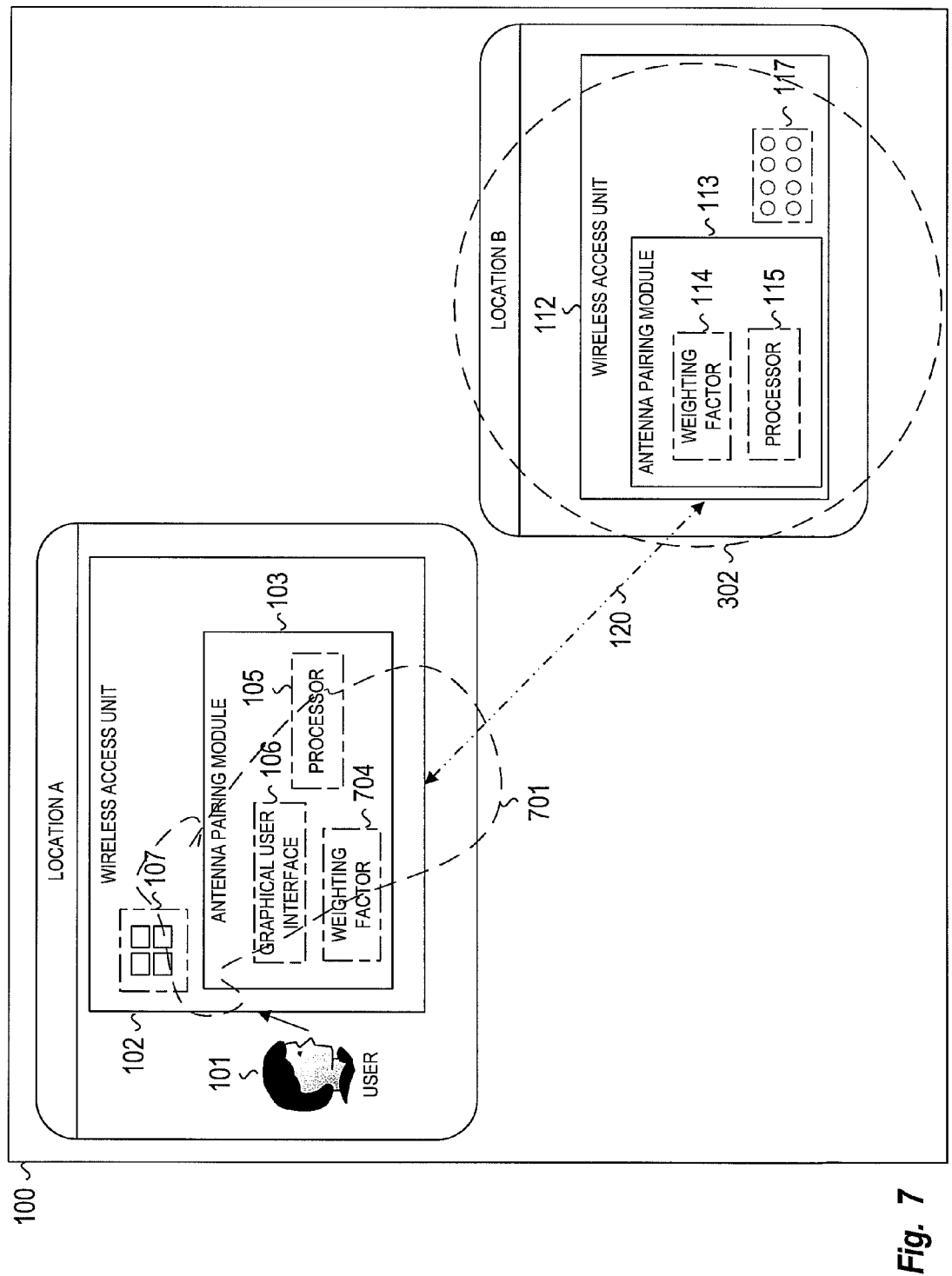
FIG. 7 is a system diagram of the wireless pairing system of FIG. 1 showing adjusted radiation patterns.

In the embodiment of FIG. 3, the user 101 selects to pair the wireless access unit 102 with the wireless access unit 112 via the GUI 106. Before wireless access units 102, 112 are paired together, wireless access unit 102 performs a 360° scan to determine the general direction of wireless access unit 112. As shown in FIG. 7, the wireless access unit processor 105 excites the antenna elements in such a way that the weighting factor 704 causes the wireless access unit 102 to have a highly directional radiation pattern 701. Once the highly directional radiation pattern 701 is formed, the communications processor 105 adjusts the weighting factor 704 so that the highly directional radiation pattern radiates around the wireless access unit 102 in all directions. When the wireless access unit 102 receives a signal from wireless access unit 112, the wireless access unit processor 105 stores in memory the range of angles where it receives a signal from wireless access unit 112. In view of the present disclosure, those skilled in the art will appreciate that wireless access unit 102 will not receive a cognizable signal from wireless access unit 112 when the main lobe of radiation pattern 701 is not in the direction of wireless access unit 112. Those skilled in the art will appreciate that the main lobe of an antenna radiation pattern is the lobe containing the maximum power, as it is the lobe that exhibits the greatest field strength.

Figure 4:
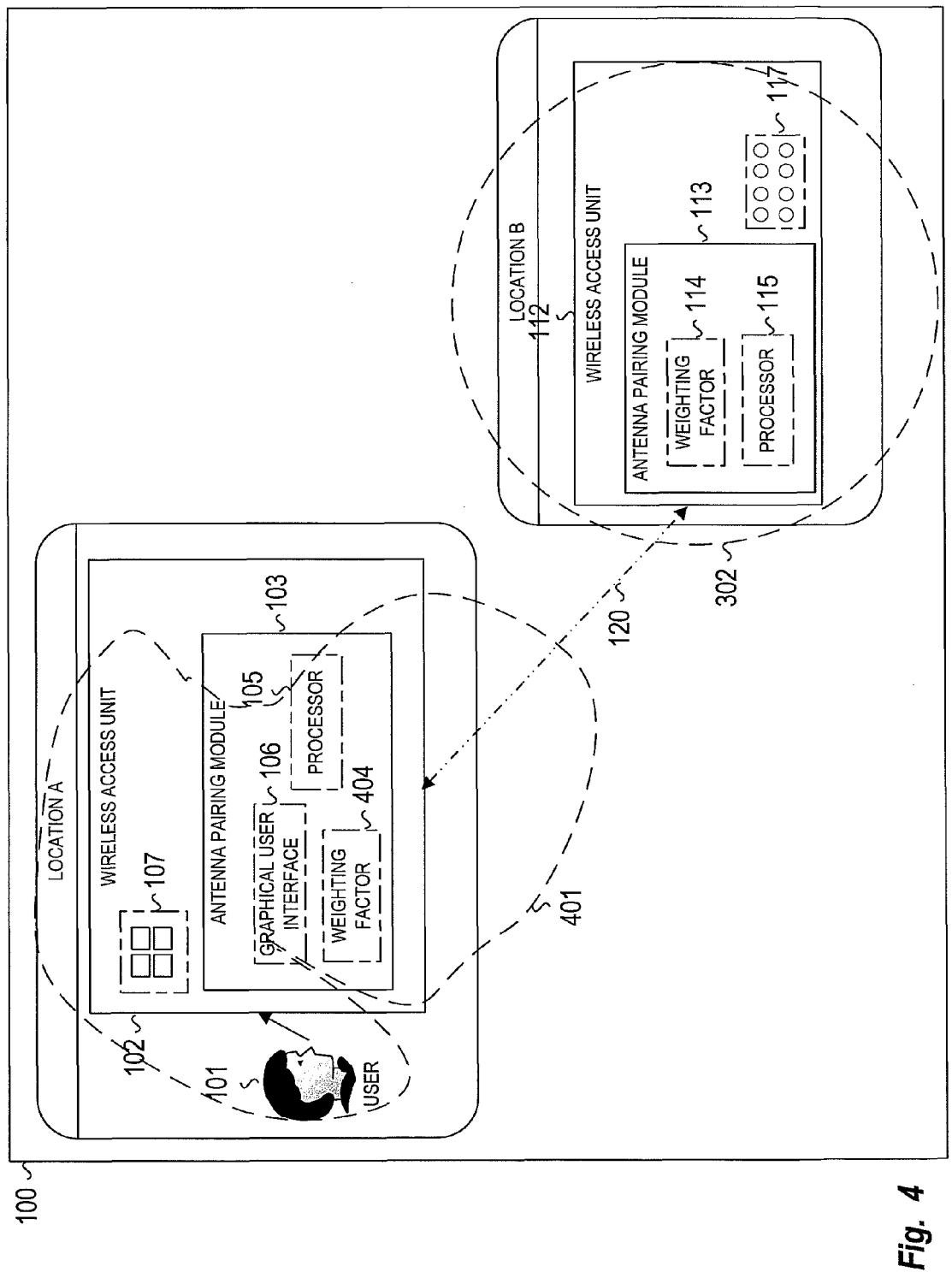
FIG. 4 is a system diagram of the wireless pairing system of FIG. 1 showing adjusted radiation patterns.

Referring to FIG. 4, an adjusted radiation pattern 401 for wireless access unit 102 has formed as a result of modified weighting factor 404. The processor 105 adjusts the radiation pattern 401 in response to wireless access unit 102 receiving feedback from wireless access unit 112. The feedback process is an on-going process by the antenna pairing module 103 interacting with and receiving feedback from the antenna pairing module 113 and the processor 115 to ensure an optimal radiation pattern between wireless access units 102, 112. The desired optimal radiation pattern depends on the user-selected configuration of pairing with only one other wireless access unit or with multiple wireless access units. In the embodiment of FIG. 4, the user 101 has selected the configuration of pairing with only one other wireless access unit (i.e., wireless access unit 112). Accordingly, the wireless access unit 102 has optimized its weighting factor 404 to maximize power radiated in the direction of the paired wireless access unit 112 and minimize power in other directions, as represented by the asymmetry of the radiation pattern 401 in FIG. 4. If the user 101 had selected a configuration of pairing with a plurality of wireless access units, then the wireless access unit 102 would have optimized its weighting factor 404 to maximize power radiated in the direction of the paired unit, but in a manner that allows the wireless access unit 102 to transmit a cognizable signal in other directions. The optimization process involves several iterations by wireless access unit processor 105 adjusting the weighting factor 404 until wireless access unit 112 receives a threshold signal strength from wireless access unit 102 via communications channel 120. The threshold signal strength is the strength of a signal needed from wireless access unit 102 to minimize the number of error bits transmitted to and from wireless access unit 102. The antenna pairing module 103 determines how the wireless access unit processor 105 should adjust weighting factor 404. Until wireless access unit 112 receives a threshold signal strength from wireless access unit 102, wireless access unit 112 transmits data to wireless access unit 102 via communications channel 120 about the strength of the signal received, including recommendations from processor 115 on how weighting factor 404 should be further modified.

Figure 5:
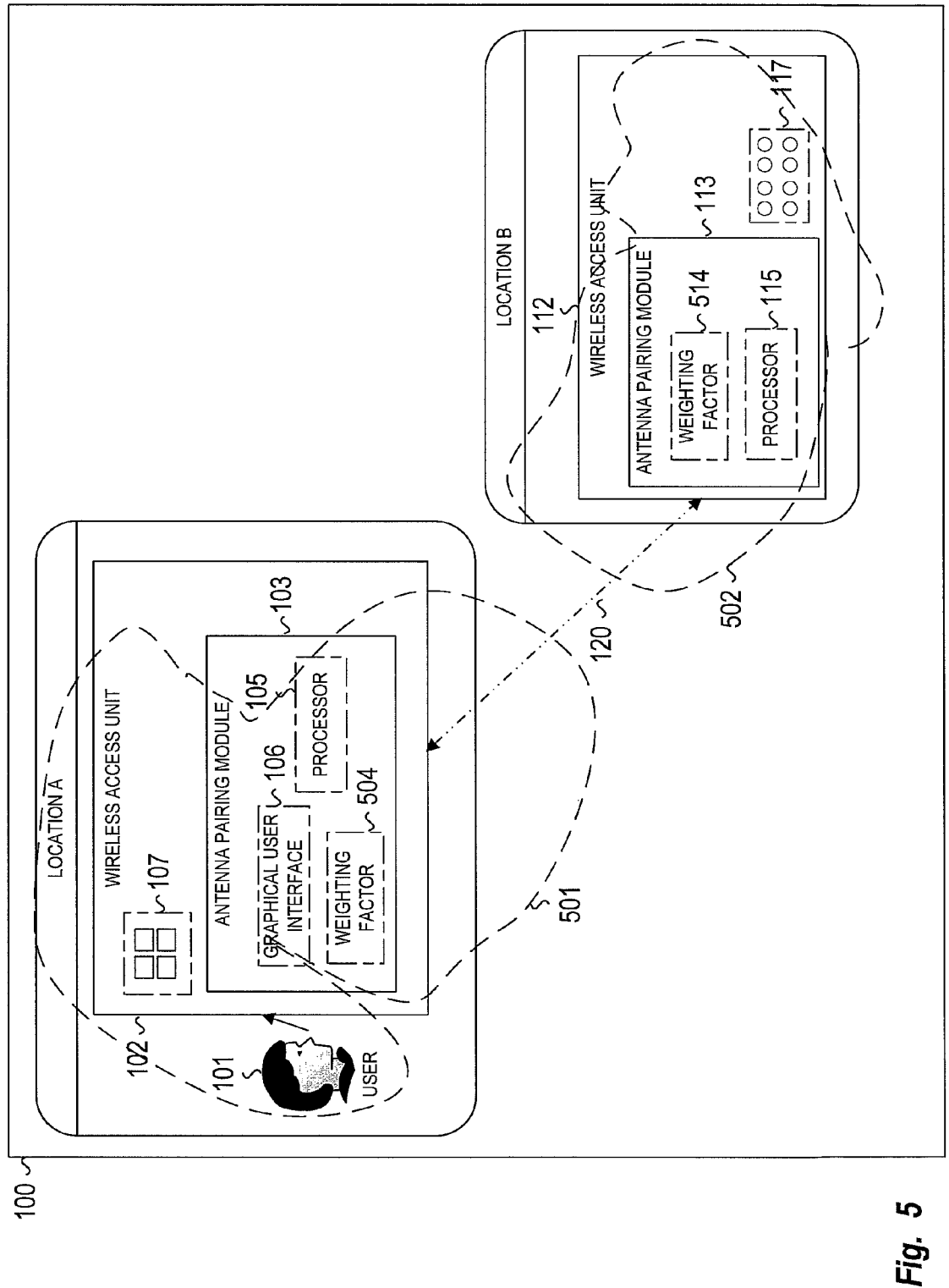
FIG. 5 is a system diagram of the wireless pairing system of FIG. 1 showing optimized radiation patterns.

Referring to FIG. 5, exemplary optimized radiation patterns 501, 502 for wireless access units 102, 112 respectively, are shown. Radiation patterns 501, 502 are determined from the weighting factors 504, 514 associated with wireless access units 102, 112, respectively. Wireless access unit 102 has stored the relative location of wireless access unit 112 based upon the 360° scan and has optimized its weighting factor 504 to form a highly directive radiation pattern 501 in the direction of wireless access unit 112. Once wireless access unit 102 has optimized its weighting factor 504, wireless access unit 112 optimizes its weighting factor 514. Wireless access unit 102 provides feedback to wireless access unit 112, which involves several iterations by wireless access unit 112 of transmitting antenna weighting factors to wireless access unit 102. By interacting with and receiving feedback from the antenna pairing module 103 and the processor 105, wireless access unit processor 115 adjusts the weighting factor 514 until wireless access unit 102 receives a threshold signal strength from wireless access unit 102. The threshold signal strength is the strength of a signal needed in the direction of the paired wireless access unit to minimize the number of error bits transmitted between the wireless access units. During the optimization process, wireless access unit 112 transmits its weighting factor 514 to wireless access unit 102. Until wireless access unit 102 receives a threshold signal strength from wireless access unit 112, wireless access unit 102 transmits data to wireless access unit 112 about the strength of the signal received, including recommendations from processor 105 on how weighting factor 514 should be further modified.

A number of calculations may be implemented by the wireless access unit processors 105, 115 to calculate the optimal weighting factors and thus the weighting factor matrix for the antenna arrays 107, 117, to produce the optimal radiation pattern of each wireless access unit 102, 112. These calculations are based on measurements of the signal strength received by the desired paired wireless access unit, the particular location of the wireless access unit, and the weighting factors received from all of the wireless access units located within the mobile ad-hoc wireless pairing system 100. The calculations are computed when a change in the wireless pairing system configuration occurs (e.g., new wireless access unit, wireless access unit movement, etc.). Each wireless access unit processor 105, 115 is located within the wireless access unit and/or the antenna pairing module 103, 133 and is electrically coupled to the antenna elements of the antenna arrays 107, 117. The wireless access unit processors 105, 115 may compute their weighting factors using techniques known in the art (e.g., Multiple Signal Classification, Estimation of Signal Parameters via Rotational Invariant Techniques).

Figure 8:
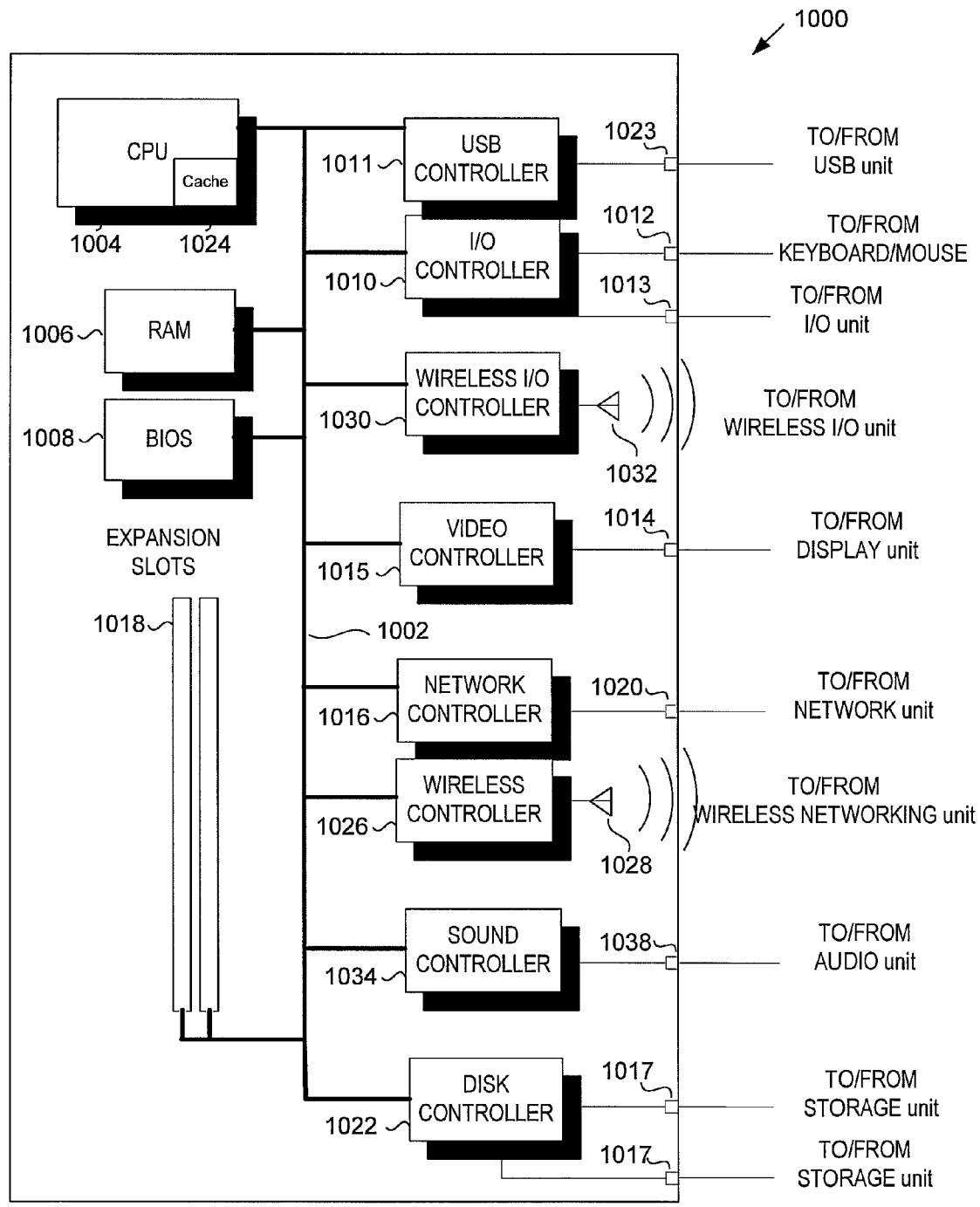
FIG. 8 is a block diagram of a computer system through which the embodiments of the present disclosure may be implemented.

FIG. 8 is a block diagram of a computer architecture or system 1000 through which the embodiments of the wireless pairing system 100, including the antenna pairing modules 103, 113 and the processors 105, 115, may be realized and/or implemented. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive, floppy disk drive, optical storage drive (e.g., CD-ROM, DVD-ROM, DVD-RW), flash memory, tape device, or other storage device (not shown). The relevant storage device(s) are connected through the external storage port 1017 which is connected to the system bus 1002 via a disk controller 1022. A keyboard and pointing device (e.g. mouse, touch pad) (not shown) can be connected to the keyboard/mouse port(s) 1012, and other I/O devices could be connected to additional I/O port(s) 1013, which are connected to the system bus 1002 through the I/O controller 1010. Additional ports or devices, such as serial ports, parallel ports, firewall adapters, or biometric devices (not shown), may be utilized through the I/O controller 1010. A display device (not shown) can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can include Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and an internal or external battery. Detailed descriptions of these devices have been omitted for convenience only and should not be construed as limiting.

Figure 6:
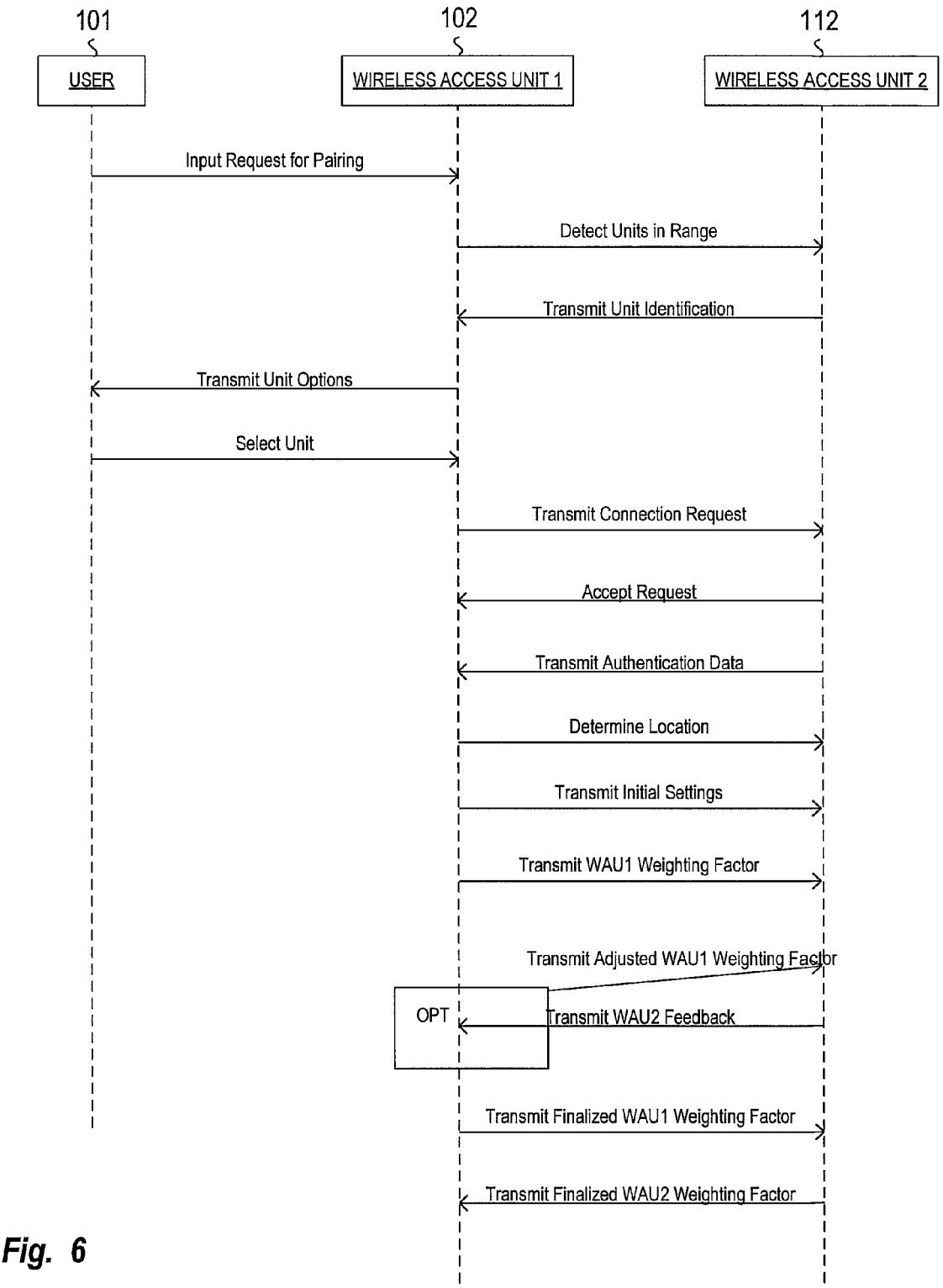
FIG. 6 is a sequence diagram according to the wireless pairing system of FIG. 1.

Referring to FIG. 6, a sequence diagram for optimizing the weighting factors of wireless access unit 102 in one embodiment is shown. The user 101 of a wireless access unit 102 requests that wireless access unit 102 seeks another unit(s) for pairing. The user 101 requests and selects units for pairing through the GUI 106. The wireless access unit 102 may report back via the GUI 106 that wireless access unit 112 is available for pairing, and the user 101 has the option of pairing wireless access unit 102 with wireless access unit 112. Once the user 101 has requested pairing through wireless access unit 102, wireless access unit 112 transmits identification data to wireless access unit 102. Before pairing is established, the wireless access unit 112 must transmit authentication data to wireless access unit 102. Next, wireless access unit 102 determines the location of wireless access unit 112 by performing a 360° scan. Once pairing is established between wireless access units 102, 112, an initialization signal can be sent to wireless access unit 112. This signal is used to determine if the wireless access unit 102 should adjust weighting factor 104. If wireless access unit 112 receives a signal with a signal strength below a threshold, then wireless access unit 112 informs wireless access unit 102 that weighting factor 104 should be adjusted. As previously mentioned, the threshold signal strength is the strength of a signal needed in the direction of the paired wireless access unit to minimize the number of error bits transmitted between the wireless access units. The user 101 is informed through the GUI 106 that the orientation of one or both wireless access units needs to be modified in order to create optimal signal coverage between the two wireless access units. During the optimization process, wireless access unit 112 reports back received signal strength to wireless access unit 102. This information is used by the wireless access unit processor 105 to adjust weighting factor 104 to 504. Once wireless access unit 102 is optimized, wireless access units 102,112 exchange weighting factors.

The various embodiments disclosed herein may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the various embodiments. The article of manufacture can be included as part of a computer system or sold separately.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of paring a first wireless access unit with a second wireless access unit in a mobile ad-hoc wireless pairing system, the method comprising:
   pairing the first wireless access unit with the second wireless access unit in response to receiving an input from a user of the first wireless access unit;
   determining a location of the second wireless access unit at least in part by adjusting a first wireless access unit antenna array weighting factor, wherein a radiation pattern, of a first wireless access unit antenna array is based on the first wireless access unit antenna array weighting factor and wherein voltages applied to excite individual antenna elements in the first wireless access unit antenna array are based on the first wireless access unit antenna array weighting factor;
   determining a threshold signal strength based on the location of the second wireless access unit, wherein the threshold signal strength corresponds to a signal strength required to transmit data between the first wireless access unit and the second wireless access unit with a minimum number of error bits;
   adjusting the first wireless access unit antenna array weighting factor until the threshold signal strength is received by the second wireless access unit;
   transmitting the first wireless access unit antenna array weighting factor to the second wireless access unit;
   receiving feedback from the second wireless access unit, wherein the feedback provides recommendations about the first wireless access unit antenna array weighting factor to the first wireless access unit; and
   adjusting the first wireless access unit antenna array weighting factor based on the feedback.

2. The method of claim 1, further comprising:
   automatically re-establishing the pairing between the first and the second wireless access unit after a previous pairing connection between the first wireless access unit and second wireless access unit has been terminated.

3. The method of claim 1, further comprising:
   providing feedback to the second wireless access unit to adjust a second wireless access unit antenna array weighting factor until the first wireless access unit receives the threshold signal strength.

4. The method of claim 1, further comprising:
   receiving a selection from the user to pair the first wireless access unit with only the second wireless access unit; and
   adjusting the first wireless access unit antenna array weighting factor until the second wireless access unit receives the threshold signal strength and a non-cognizable signal is transmitted in a direction where the second wireless access unit is not located.

5. The method of claim 1, further comprising:
   receiving a selection from a user to pair the first wireless access unit with the second wireless access unit and the option of pairing with at least one other wireless access unit; and
   adjusting the first wireless access unit antenna array weighting factor until the second wireless access unit receives the threshold signal strength and a cognizable signal is transmitted in a direction where the second wireless access unit is not located.

6. The method of claim 1, wherein amplitude and phase of individual antenna elements in the first wireless access unit antenna array are based on the first wireless access unit antenna array weighting factor.

7. A system for pairing a first wireless access unit with a second wireless access unit in a mobile ad-hoc wireless pairing system, the system comprising:
   (a) the first wireless access unit having a first wireless access unit processor configured to control a first wireless access unit antenna array weighting factor and to facilitate transmission of the first wireless access unit antenna array weighting factor to the second wireless access unit, wherein a radiation pattern of a first wireless access unit antenna array is based on the first wireless access unit antenna array weighting factor and wherein voltages applied to excite individual antenna elements in the first wireless access unit antenna array are based on the first wireless access unit antenna array weighting factor; and
   (b) the second wireless access unit having a second wireless access unit processor configured to control a second wireless access unit antenna array weighting factor and to facilitate transmission of the second wireless access unit antenna array weighting factor to the first wireless access unit, wherein:
      (i) the first wireless access unit processor is configured to modify the first wireless access unit antenna array weighting factor to determine a location of the second wireless access unit and further configured to determine a threshold signal strength based on the location, wherein the threshold signal strength corresponds to a signal strength required to transmit data between the first wireless access unit and the second wireless access unit with a minimum number of error bits;

(ii) the first wireless access unit is configured to receive an input from a user to pair the first wireless access unit with the second wireless access unit;

(iii) the second wireless access unit is configured to receive a signal from the first wireless access unit;

(iv) the second wireless access unit processor is configured to provide recommendations about the first wireless access unit antenna array weighting factor to the first wireless access unit; and (v) the first wireless access unit is further configured to adjust the first wireless access unit antenna array weighting factor based on the recommendations.

8. The system of claim 7, wherein the first wireless access unit processor is configured to automatically re-establish pairing between the first and the second wireless access unit after a previous pairing connection between the first wireless access unit and second wireless access unit has been terminated.

9. The system of claim 7, wherein the first wireless access unit processor is configured to provide feedback to the second wireless access unit to adjust the second wireless access unit antenna array weighting factor until the first wireless access unit receives the threshold signal strength.

10. The system of claim 7, wherein the first wireless access unit is configured to receive a selection from a user to pair the first wireless access unit with only the second wireless access unit, and wherein the first wireless access unit processor is configured to adjust the first wireless access unit antenna array weighting factor until the second wireless access unit receives a threshold signal strength and a non-cognizable signal is transmitted in a direction where the second wireless access unit is not located.

11. The system of claim 7, wherein the first wireless access unit is configured to receive a selection from a user to pair the first wireless access unit with the second wireless access unit and the option of pairing with at least one other wireless access unit, and wherein the first wireless access unit processor is configured to adjust the first wireless access unit antenna array weighting factor until the second wireless access unit receives a threshold signal strength and a cognizable signal is transmitted in a direction where the second wireless access unit is not located.

* * * * *

UNITED STATES PATENT AND TRADEMARK OFFICE
CERTIFICATE OF CORRECTION

PATENT NO. : 8,570,938 B2
APPLICATION NO. : 12/201403
DATED : October 29, 2013
INVENTOR(S) : Eldering It is certified that error appears in the above-identified patent and that said Letters Patent is hereby corrected as shown below:

On Title Page 2, in Item (56), under "OTHER PUBLICATIONS", in Column 2, Line 12, delete "montana.edu//ee/rwolff/EE5481EE548-S06/UWB/Intro_" and insert -- montana.edu//ee/rwolff/EE548/EE548-S06/UWB/Intro_ --, therefor.

Signed and Sealed this
Third Day of June, 2014

Michelle K. Lee
*Deputy Director of the United States Patent and Trademark Office*